United States Patent [19]

Shimizu et al.

[11] 3,865,617

[45] Feb. 11, 1975

[54] METHOD OF COATING BY REDOX POLYMERIZATION

[75] Inventors: Syozo Shimizu; Hiroshi Shinohara; Toshihito Kondou; Norimasa Yamada, all of Aichi, Japan

[73] Assignee: Toyota Jidosha Kogyo Kabushiki Kaisha, Toyota-shi, Aichi-ken, Japan

[22] Filed: July 17, 1972

[21] Appl. No.: 272,400

[30] Foreign Application Priority Data
Aug. 11, 1971 Japan.................................. 46-60801

[52] U.S. Cl..... 117/132 C, 117/DIG. 3, 148/6.14 R
[51] Int. Cl.......................... B44d 1/06, B32b 15/08
[58] Field of Search........... 117/113, 132 C, DIG. 3; 148/6.2, 6.14 R; 204/181

[56] References Cited
UNITED STATES PATENTS

| 2,496,596 | 2/1950 | Moyer et al. .................. 117/DIG. 3 |
| 2,902,390 | 9/1959 | Bell...................................... 117/132 |
| 3,397,077 | 8/1968 | Boller et al. ........................ 148/6.15 |
| 3,585,084 | 6/1971 | Steinbrecher et al................ 148/6.2 |
| 3,647,567 | 3/1972 | Schweri............................ 117/132 C |

FOREIGN PATENTS OR APPLICATIONS

| 1,155,497 | 6/1969 | Great Britain...................... 117/132 |
| 1,099,461 | 1/1968 | Great Britain...................... 117/132 |

Primary Examiner—Harry J. Gwinnell
Attorney, Agent, or Firm—Brisebois & Kruger

[57] ABSTRACT

Method of coating a metallic object with a vinyl base polymerized film by immersing the metallic object in an aqueous organic solvent solution of a water insoluble vinyl monomer containing a metal ion releasing agent and a polymerization catalyst.

9 Claims, No Drawings

METHOD OF COATING BY REDOX POLYMERIZATION

BACKGROUND OF THE INVENTION

Recently, the electrophoretic painting process has come to be widely adopted for industrial applications. According to this process, an electroconductive object is coated by electrolysis, cataphoresis, and electrodeposition, using a prepolymer solution with a molecular weight of certain magnitude. This process, however, involves several steps, such as water rinsing, air blowing, curing, or removal of excess amine from the tank; moreover, it requires an adequately polymerized prepolymer paint.

More recently, an electrolytic polymerization painting process, by which an organic film can be directly applied through electrolysis of a monomer solution, has been developed; but this process has the problems in that the organic solvent evaporated, the film is dissolved by the solvent and an absorption of moisture by the solution results in a marked drop in the degree of polymerization attained. These problems may probably be attributed to the mechanism of the process relying on ion polymerization.

The present invention is entirely different in its principle from these conventional methods. Namely, its principle lies in redox polymerization, by which a polymerized film is formed on an object to be coated, which has only to be immersed in a monomer solution. It is a well-known fact that a redox type mechanism is being utilized to initiate a radical reaction in the industrial field of high molecular polymerization, but this applications has been limited mainly to bulk polymerization and there is little precedent for causing a redox polymerization on the surface of an object to be coated and thereby forming a polymerized film thereon, as proposed by the present invention.

British Patent No. 1,155,497 describes a process similar to the present invention, but this parrent employs perfectly water-soluble N-3-oxohydroxyalkyl acrylamide derivatives as the monomer and hydrogen peroxide as the initiator; and for reason of water solubility, use of any other monomer has been out of the question. Moreover, according to the process of this patent, which does not permit copolymerization with any other monomer or the addition of a plasticizer, the essential properties of an organic film of this kind, such as flexibility, adhesion, rigidity, durability, and hardness, can be acquired only through intramolecular plasticization or addition of a substituted vinyl monomer. For reasons of dissolution in water or synthesis technique, however, these properties cannot be satisfactorily imparted to the N-3-oxohydroxyalkyl acrylamide derivatives and accordingly, the process of this patent is of limited applicability. Moreover, since the patented process uses mineral acids alone to release metal ions, the film quality has been poor due to the anion contents ($SO_4^{--}$, $Cl^-$, $Br^-$ $NO_3^-$ etc.) from these mineral acids.

Further, there has been the problem that the process is effective to coat only the metals containing Fe or Fe ions and is inapplicable to other metals, such as lead, aluminum, nickel, zinc, copper and alloys containing these elements.

After strenuous efforts to solve these problems, the present inventors have reached the conclusion that the principle of redox polymerization can work on even a common vinyl polymer if this polymer is employed together with a hydrophilic organic solvent, an acid, and an organic peroxide, and have confirmed the feasibility of the process through numerous experiments.

SUMMARY OF THE INVENTION

The present invention relates to a redox polymerization coating process characterized by the fact that a polymerized film of vinyl polymer is formed on the surface of an object to be coated by immersing the object in a film-forming solution which has been prepared by dissolving at least one vinyl or divinyl monomer in an aqueous solution containing a hydrophilic organic solvent; adjusting the pH of the solution by introducing an inorganic or organic acid to release metal ions; and then dissolving in and mixing with the resulting solution at least one polymerization catalyst selected from the group consisting of peroxides, perchlorates, chlorates, and persulfates.

The primary object of the present invention is to provide a method of coating by Redox Polymerization which eliminates the problem of the conventional methods and creates an availability of almost all vinyl monomers for direct polymerization coating of metallic objects.

According to the present invention, a hydrophilic organic solvent is uttilized to render a wide variety of vinyl monomers soluble in water and in consequence, the applicable monomer can be increased. It has been common knowledge that acryl esters contribute to plasticity; acrylnitriles to adhesion; acrylamides and divinyl monomers to hardness; and divinyl monomers to durability through increased cross linking. Adoption of a hydrophilic organic solvent permits full utilization of this wide variety of vinyl monomers.

Another object of the present invention is to provide a method of coating by Redox Polymerization which allows direct application of a polymerized film even on metals other than Fe or Fe-containing objects.

A further object of the present invention is to provide a method of coating by Redox Polymerization which not only allows the use of a single kind of monomer, but also, a plurality of kinds of monomers with different characteristics in combination, thereby freely imparting the essential qualities such as flexibility, adhesion, durability and hardness; this feature has the advantage that a complicated technique of monomer synthesis is rendered unnecessary because, unlike the conventional method, these qualities can be achieved without modifying the molecular structure of the monomer itself.

To be more specific, the process according to the present invention involves the following steps:

1. Dissolving one or more vinyl or divinyl monomers of acrylic acids, acrylate esters, vinyl ethers, acrylamides and acrylnitriles in an aqueous solution containing a hydrophilic organic solvent;
2. Adding to the resulting solution an inorganic or an organic acid which adjusts the pH value from 0.5 to 5.5, serving as the metal ion releasing agent;
3. Further dissolving a peroxide, a perchlorate, a chlorate or a persulfate as the polymerization catalyst in the solution, and thoroughly stirring it; and
4. Immersing an object to be coated in the above solution for 1–60 minutes, thereby forming a polymerized film on the surface; and finally rinsing the object with water and drying it. The drying after rinsing may be done at room temperature, but heating will yield a stronger film.

The best vinyl monomers available are: acrylonitrile, methacrylonitrile, methyl acrylate, methyl methacrylate, acrylamide, methacrylamide, ethyl acrylate, ethyl methacrylate, methyl vinyl ketone, glycidil acrylate, gylcidil methacrylate, vinyl acetate and acrolein; but the following compounds also have a useful film-forming ability; ethyl vinyl ketone, vinyltoluene, styrene, α-methyl styrene, 2-hydroxy ethyl methacrylate, ethyl vinyl ether, vinyl pyrolidone and vinyl isocyanate compounds.

The following divinyl monomers are effective to increase the molecular weight and thickness of the film and enhance the hardness due to increased crosslinking; divinyl monomers such as N,N'-methylene-bis acrylamide, divinylsulfone, divinylbenzene, ethylene glycoldimethacrylate, ethylene glycol diacrylate, calcium acrylate; and divinyl urethanes such as di(2'-methacryloxyethyl)-4-methyl-meta-phenylenediurethane.

The concentration of these vinyl monomers should be 1–50 % by weight, but that of divinyl monomers may be lower than that of vinyl monomers. In the case of a monomer which is difficult to dissolve in water, a hydrophilic organic solvent should be added. Appropriate hydrophilic organic solvents for this purpose include: methyl alcohol, ethyl alcohol, propyl alcohol, butyl alcohol, N,N-dimethyl formamide, dimethylsulfoxide, dioxane, N,N-dimethyl acetoamide, ethyl acetate, methyl ethyl ketone, methyl isobutyl ketone, butyl cellosolve, diacetone alcohol and acetonitrile. Benzene, toluene and xylene, when coupled with other solvents, will be effective in preventing a formed film from redissolving; these organic solvents will also be useful as a dissolving promoter not only for monomers, but also for the organic salts or aqueous solutions of organic peroxides to be mentioned later.

The addition of these hydrophilic organic solvents will also remarkably improve the smoothness of the formed film surface.

The concentration of the organic solvent in the aqueous solution is 0.5–95 %. However, when the proportion of the organic solvent to water is high, the film formed by polymerization becomes liable to be dissolved or the release of metal ions is inhibited and as a result, the film formation decreases. Therefore, in preparing the aqueous solution of an organic solvent, consideration should be taken of the kind and concentration of monomer, the kind and concentration of peroxide and the molecular weight and solubility to the organic solvent of a formed polymer.

The best pH adjusters available as the metal ion releasing agent include; formic acid, acetic acid, propionic acid, butyric acid, malonic acid, succinic acid, glutaric acid, adipic acid, pimelic acid, maleic acid, itaconic acid, benzoic acid, O-phthalic acid, terephthalic acid, trimetic acid, pyromellitic acid, crotonic acid and methacrylic acid; these organic acids have excellent film-forming characteristics. If, however, the film-forming rate is to be accelerated and the film weight to be increased, the use of sulfuric acid, nitric acid, hydrochloric acid, fluoric acid, chromic acid, phosphoric acid or boric acid will be effective.

The combined use of organic and inorganic acids is also possible. The addition of such a pH adjuster, which serves as the metal ion releasing agent, should be made in the amount required to maintain the pH value of the solution at 0.5–5.5. In a pH range lower than this, the polymerized film surface becomes rough and tinted. This is probably due to the release of metal ions from the metal surface taking place violently at a high acidity of less than 0.5 pH, but a more elaborate scientific explanation is possible. At over 5.5 pH, the film-forming rate slows down.

The polymerization catalysts available include: the hydroperoxide type such as hydrogen peroxide, cumene hydroperoxide, p-menthanehydroperoxide and t-butyl hydroperoxide; the ketone peroxide type such as methyl ethyl ketone peroxide, and cyclo hexanone peroxide; the di-alkyl peroxide type such as di-t-butyl peroxide, di-cumyl peroxide and the like; the di-acyl peroxide type such as benzoyl peroxide and lauroyl peroxide; the peroxy ester type such as t-butyl peroxy benzoate and the like. Also useful are: peroxides such as potassium persulfate, ammonium persulfate, potassium perchlorate, sodium perchlorate; and inorganic compounds such as sodium chlorate and lithium chlorate.

The appropriate addition of these catalysts for polymerization is in the proportion of $1 \times 10^{-3}$ to $1 \times 10^{-1}$ mol/l, but in the use of commercially available organic peroxides, their effective activity should be considered. The effective activity is defined as the percentage of pure peroxide contained in a commerical peroxide after storage during which some part has turned into oxide through decomposition.

For the quantitative analysis of the effective peroxide content in an organic peroxide, reference may be made "Chemistry of Organic Peroxides" (by Yoshio OGATA, published by Nankodo, 1971, pp. 330-343.

The above-mentioned monomer, the organic solvent which promotes dissolution, and an aqueous solution containing the polymerization catalyst and the pH adjuster which functions as a metal ion releasing agent, are thoroughly mixed together.

The solution prepared in this manner is poured into a vessel made of glass, enamel, or plastic, or lined with resin; and a plate to be coated is immersed in this vessel. The plate to be coated is made of transition elements such as Copper, Zinc, Chromium, Iron, Cobalt, Nickel, Titanium, Molybdenum; or other metals such as Aluminum, Lead, Tin, and their alloys or composite materials.

The most appropriate temperature of the solution for polymerization coating is from − 20° to 60°C; at temperatures lower than − 20°C, the solution may freeze, depending on its composition, or the reaction in it may be retarded. At over 60°C, on the contrary, the evaporation of water or organic solvent in the solution may become too fast or the storage properties of the solution may detoriorate through polymerization and agglomeration or the turnover quality of the solution may become poor. Moreover, the film surface condition becomes poor as the result of the polymerization reaction being too fast. A more desirable temperature range for the solution would be 0°—40°C. and the best temperature range would be 10°–35°C. Depending on the composition and the temperature of the solution, or the cleanliness of the plate to be coated, the film on the plate can be formed in a time period from 1 second to 1 hour. If the immersing time is too short, the film may become rough or ridged and the plate surface will become liable to be etched, because the pH value of the solution has to be set at 0.5 or less. If, on the contrary, the immersion time is too long, the film may become defective with swelling, a pin hole or a ridging; and in the worst case, something like whiskers may develop on the film surface. Thus, the immersion time should be 0.5–20 minutes, or more desirably 2–9 minutes.

After a specified time of immersion, the plate is rinsed with water and subjected to air blowing. Then, if necessary, it is heated to dry for 10 minutes to 3 hours at 70°–300°C, and as result, the hardness and firmness of the film can be improved.

The following Examples show ways in which the invention can be practiced, but should not be construed as limiting the invention. All parts are parts by weight.

EXAMPLE 1

1. Preparation of a treating solution for polmerization

| Coating | |
|---|---|
| Acrylonitrile | 5.5 parts |
| Acrylamide | 14.5 parts |
| Ethylacrylate | 22.0 parts |
| Water | 100 parts |
| N,N-dimethylformamide | 100 parts |

A solution of the above composition was poured into a glass vessel and adjusted to a pH value of 2.0 by using a sulfuric acid of 50 % concentration by weight. A solution containing 0.5 parts of cumenhydroperoxide in 10 parts of dimethylformamide was then added and stirred in thoroughly to obtain a coating solution.

2. Preparation of the metal plate for coating

A plate was prepared by subjecting the surface of a mild steel plate measuring $60 \times 30 \times 0.5$ mm to the following treatment.

The treatment comprised the following steps: (1) rinsing with water; (2) degreasing with an aqueous solution of ortho-sodium silicate at a bath temperature of 50°C. and a current density of $60\pm/mA/cm^2$, for $50\pm 10$ seconds on the cathodic side, $30\pm 10$ seconds on the anodic side; (3) rinsing with water; (4) neutralization by immersion in a 15 % aqueous solution of hydrochloric acid for 10 seconds; and (5) rinsing with water. Through this treatment, the oxide scale, dirt and grease on the metal surface were removed.

3. Polymerization film formation

The surface of the plate treated by the above-mentioned method was immersed in a bath of the above-mentioned coating liquid at 20°C. so that the surface areas totaling 30 $cm^2$ were immersed. After 20 seconds of immersion, a polymerized film began to be deposit on the plate surface; one minute later, the metal surface became invisible; and with continued immersion, the thickness of the film deposited on the surface increased. After 8 minutes of immersion the specimen was lifted out of the solution rinsed with water and dried at room temperature, yielding a polymerized film. The film weighed 95.2 mg/30 $cm^2$(about 3.17 mg/$cm^2$), its thickness being 40$\mu$ as measured by a Kette electromagnetic microthickness gauge. The film hardness was equivalent to H in term of pencil hardness. The film adhesion turned out to be 100/100 in a checkered tape test and the result of a 2 mm dia. bending test were satisfactory.

EXAMPLE 2-25

The procedure of Example 1 was followed, using different vinyl monomers, polymerization catalysts, pH adjusters and specimens, as summarized in the following table, in which the symbols employed denote the following substances:

Monomers -
  AN : acrylonitrile
  AAM : acrylamide
  MBAM : N,N'-methylene bisacrylamide
  EA : ethyl acrylate
Monomers (contd.)
  MA : methyl acrylate
  EGMA : ethyleneglycol dimethacrylate
  MVK : methyl vinyl ketone
Organic solvents -
  DMF : N,N-dimethyl formamide
  DMSO : dimethylsulfoxide
  EtOH : ethyl alcohol
  EtAC : ethyl acetate
Polymerization catalysts -
  CHP : cumene hydro peroxide
  CHPO : cyclohexanone peroxide
  TBPB : tert-butyl peroxy benzoate

| Example No. | 2 | | 3 | | 4 | | 5 | | 6 | | 7 | |
|---|---|---|---|---|---|---|---|---|---|---|---|---|
| Monomer (part)[1] | | | | | | | | | | | | |
| | AN | 15.0 | AN | 2.5 | MA | 43 | MA | 43 | MA | 43 | EGMA | 10 |
| | AAM | 10.0 | AAM | 10.0 | MBAM | 2 | MBAM | 2 | MBAM | 2 | MVK | 35 |
| | EA | 14.5 | EA | 28.0 | | | | | | | | |
| | | | MBAM | 0.5 | | | | | | | | |
| Water[1] | | | | | | | | | | | | |
| | 100 | | 90 | | 95 | | 95 | | 95 | | 95 | |
| Organic solvent[1] | | | | | | | | | | | | |
| | DMF | 100 | DMSO | 110 | DMF | 100 | DMSO | 100 | DMF | 100 | DMF | 100 |
| Polymerization initiator[1] | | | | | | | | | | | | |
| | CHP | 0.5 | CHP | 0.5 | CHPO | 0.7 | TBPB | 0.6 | Potassium persulfate | 0.4 | CHP | 5 0.5 |
| pH adjuster[1] | | | | | | | | | | | | |
| | $H_2SO_4$ | | $H_2SO_4$ | | $H_2SO_4$ | | $H_2SO_4$ | | $H_2SO_4$ | | $H_2SO_4$ | |
| pH of solution[1] | | | | | | | | | | | | |
| | 2.0 | | 2.0 | | 2.5 | | 2.0 | | 2.0 | | 2.0 | |
| Specimen material[2] | | | | | | | | | | | | |
| | Fe(mild steel plate) | | Fe(mild steel plate) | | Zn | | Cu | | Fe | | Fe | |
| Pretreating[2] | | | | | | | | | | | | |
| | Electrolytic | | Electrolytic | | Solvent | | Electrolytic | | Electrolytic | | Electrolytic | |

| Example No. | | | | | |
|---|---|---|---|---|---|
| 2 | 3 | 4 | 5 | 6 | 7 |
| degreasing | degreasing | degreasing | degreasing | degreasing | degreasing |
| | | Immersing time (min)[2] | | | |
| 8 | 8 | 4 | 4 | 8 | 8 |
| | | Solution temperature (°C)[3] | | | |
| 25 | 25 | 20 | 20 | 10 | 10 |
| | | Drying method[3] Heat-dry condition | | | |
| Room temperature | 80°C × 10(min) | Room temperature | 120° × 10(min) | Room temperature 120° × 20(min) | Heating 150° × 10(min) |
| | | Film deposition(mg/cm²)[4] | | | |
| 7.9 | 16.7 | 2.0 | 3.5 | 28.5 | 7.86 |
| | | Film thickness($\mu$)[4] | | | |
| 5 | 60 | 5 | 25 | 90 | 50 |
| | | Film hardness (pencil)[4] | | | |
| 2 B | 2 H | H | H | 4B(2H)* | H |
| | | Checkered tape[4] | | | |
| 100/100 | 100/100 | 100/100 | 100/100 | 100/100 | 100/100 |
| | | Flexibility 2mm$\phi$[4] | | | |
| Good | Good | Good | Good | Good | Good |
| | | Usability[4] | | | |
| High | High | High | High | High | |

| Example No. | | | | | |
|---|---|---|---|---|---|
| 8 | 9 | 10 | 11 | 12 | 13 |
| | | Monomer (part)[1] | | | |
| MA 43 MBAM 2 | MA 43 MBAM 2 | MA 43 MBAM 2 | MA 43 MBAM 2 | AN 3 AAN 22 EA 16 | AN 10 AAM 13 EA 18 MBAM 2 |
| | | Water[1] | | | |
| 95 | 95 | 95 | 95 | 100 | 100 |
| | | Organic solvent[1] | | | |
| DMF 100 | DMF 100 | DMF 100 | DMF 100 | DMF 100 | DMF 100 |
| | | Polymerization initiator[1] | | | |
| CHP 0.5 | CHP 0.5 | CHP 0.5 | CHP 0.5 | CHP 0.5 | CHP 0.5 |
| | | pH adjuster[1] | | | |
| HCl | CH₃COOH | Succinic acid | Trimetic acid | H₂SO₄ | H₂SO₄ |
| | | pH of solution[1] | | | |
| 2.0 | 3.4 | 3.6 | 2.8 | 2.0 | 2.0 |
| | | Specimen material[2] | | | |
| Fe | Fe | Fe | Fe | Fe | Fe |
| | | Pretreating[2] | | | |
| Electrolytic degreasing | Electrolytic degreasing | Electrolytic degreasing | Electrolytic degreasing | Electrolytic degreasing | Electrolytic degreasing |
| | | Immersing time (min)[3] | | | |
| 8 | 8 | 8 | 8 | 8 | 8 |
| | | Solution temperature (°C)[3] | | | |
| 10 | 10 | 10 | 10 | 5 | 20 |
| | | Drying method[3] Heat-dry condition | | | |
| 150° × 20(min) | 150° × 20(min) | 150° × 20(min) | 150° × 20(min) | Room temperature | Heating 120° × 10(min) |
| | | Film deposition(mg/cm²)[4] | | | |
| 11.8 | 5.5 | 3.6 | 3.8 | 1.7 | 7.1 |
| | | Film thickness ($\mu$)[4] | | | |
| 70 | 30 | 20 | 20 | 10 | 50 |
| | | Film hardness (pencil)[4] | | | |
| 2H | 2H | H | H | 4H | H |
| | | Checkered tape[4] | | | |

-Continued

Example No.

| | 8 | 9 | 10 | 11 | 12 | 13 |
|---|---|---|---|---|---|---|
| | 100/100 | 100/100 | 100/100 | 100/100 | 100/100 | 100/100 |
| Flexibility 2mmφ[4] | Good | Good | Good | Good | Good | Good |
| Usability[4] | | | | | High | High |

Example No.

| | 14 | 15 | 16 | 17 | 18 | 19 |
|---|---|---|---|---|---|---|
| Monomer (part)[1] | MA 43  MBAM 2 | MA 43  MBAM 2 | MA 43  MBAM 2 | MA 43  MBAM 2 | MA 43  MBAM 2 | MA 43  MBAM 2 |
| Water[1] | 100 | 100 | 100 | 95 | 95 | 95 |
| Organic Solvent[1] | DMF 100 | DMF 100 | DMF 100 | DMF 100 | DMF 100 | DMF 100 |
| Polymerization initiator[1] | $H_2O_2$ 0.1 | TMHP 0.3 | Ammonium persulfate 0.7 | CHP 0.5 | CHP 0.5 | CHP 0.5 |
| pH adjuster[1] | $H_2SO_4$ | $H_2SO_4$ | $H_2SO_4$ | $H_2SO_4$ | $HNO_3$ | HCOOH |
| pH of solution[1] | 2.0 | 2.0 | 2.0 | 2.0 | 2.0 | 2.4 |
| Specimen material[3] | Fe | Pb | Cu | Cu | Pb | Cu |
| Pretreating[2] | Electrolytic degreasing | Solvent degreasing | Solvent degreasing | Electrolytic degreasing | Electrolytic degreasing | Electrolytic degreasing |
| Immersing time (min)[3] | 4 | 4 | 4 | 4 | 4 | 4 |
| Solution temperature (°C)[3] | 25 | 20 | 20 | 20 | 20 | 20 |
| Drying method[3] Heat-dry condition | Heating 120° × 10(min) | Heating 120° × 10(min) | Heating 120° × 10(min) | Heating 120° × 10(min) | Heating (120° × 10min) | Heating 120° × 10(min) |
| Film deposition (mg/cm²) | 8.8 | 0.6 | 8.2 | 7.8 | 1.45 | 5.5 |
| Film thickness (μ)[4] | 62 | 4 | 60 | 60 | 5 | 30 |
| Film hardness (pencil)[4] | H | H | H | H | H | H |
| Checkered tape[4] | 100/100 | 100/100 | 100/100 | 100/100 | 100/100 | 100/100 |
| Flexibility 2mmφ[4] | Good | Good | Good | Good | Good | Good |
| Usability[4] | High | High | High | High | High | High |

Example No.

| | 20 | 21 | 22 | 23 | 24 | 25 |
|---|---|---|---|---|---|---|
| Monomer (part)[1] | MA 43  MBAM 2 | MA 43  MBAM 2 | MA 43  MBAM 2 | MA 43  MBAM 2 | MA 43  MBAM 2 | MA 43  MBAM 2 |
| Water[1] | 95 | 95 | 95 | 95 | 95 | 95 |
| Organic solvent[1] | DMF 100 | DMF 100 | DMF 100 | DMF 100 | EtOH 100 | EtAC 100 |
| Polymerization initiator[1] | CHP 0.5 | CHP 0.5 | CHP 0.5 | CHP 0.5 | CHP 0.5 | CHP 0.5 |

—Continued

| Example No. | | | | | |
|---|---|---|---|---|---|
| 20 | 21 | 22 | 23 | 24 | 25 |
| pH adjuster[1] | | | | | |
| n-butyric acid | Adipic acid | Maleic acid | Acrylic acid | $H_2SO_4$ | Acrylic acid |
| pH of solution[1] | | | | | |
| 2.5 | 3.7 | 2.3 | 3.2 | 2.0 | 3.2 |
| Specimen material[2] | | | | | |
| Fe | Cu | Fe | Fe | Fe | Cu |
| Pretreating[2] | | | | | |
| Electrolytic degreasing | Electrolytic degreasing | Electrolytic degreasing | Electrolytic degreasing | Electrolytic degreasing | Electrolytic degreasing |
| Immersing time (min)[2] | | | | | |
| 4 | 4 | 2 | 8 | 8 | 10 |
| Solution temperature (°C)[3] | | | | | |
| 20 | 20 | 20 | 20 | 20 | 10 |
| Drying method[3] / Heat-dry condition | | | | | |
| Heating 120° × 10(min) | Heating 120° × 10(min) | Heating 120° × 10(min) | Heating 120° × 10(min) | Room temperature | Heat & drying 120°C × 30(min) |
| Film deposition (mg/cm$^2$)[4] | | | | | |
| 1.25 | 1.45 | 5.05 | 2.9 | 7.0 | 10.3 |
| Film thickness ($\mu$)[4] | | | | | |
| 5 | 5 | 30 | 20 | 30 | 60 |
| Film hardness (pencil)[4] | | | | | |
| H | H | H | H | 2 B | 2 B |
| Checkered Tape[4] | | | | | |
| 100/100 | 100/100 | 100/100 | 100/100 | 100/100 | 100/100 |
| Flexibility 2mm$\phi$[4] | | | | | |
| Good | Good | Good | Good | Good | Good |
| Usability[4] | | | | | |
| High | High | High | High | High | High |

[1] Treating solution.
[2] Specimen.
[3] Conditions.
[4] Physical Properties.

The foregoing constitute representative examples of the successful application of the process in accordance with the present invention, but they do not exhaust the possible applications of the present invention. A film with better characteristic may be obtained by freely selecting or combining the above-menthioned monomers, solvents, polymerization catalysts and metals to be coated with dependence on the aim and use. It is possible to add a coloring agent such as a dye or pigment, and an extender such as colored filler to this treating solution for polymerization coating.

What is claimed is:

1. Method of coating a metal object by redox polymerization, which comprises the steps of dissolving 1–50% by weight of said solution of at least one water insoluble vinyl or divinyl monomer in an aqueous solution containing 0.5–95% of a hydrophilic organic solvent for said monomer; adjusting the pH value of the resulting solution to 0.5–5.5 by introducing an acid which is a metal ion releasing agent for the metal in said metal object to be coated; adding at least one polymerization catalyst selected from the group consisting of peroxides, perchlorates, chlorates and persulfates to said solution, to produce a film-forming solution having a temperature between −20°C. and 60°C. and forming a polymerized film of vinyl polymer on said metal object while immersing said object in said film-forming solution.

2. The coating method of claim 1, wherein the said vinyl monomer is selected from the group consisting of acrylonitrile, methacrylonitrile, methyl acrylate, methyl methacrylate, acrylamide, methacrylamide, ethyl acrylate, ethyl methacrylate, methyl vinyl ketone, glycidil acrylate, glycidil methacrylate, vinyl acetate, acrolein, ethyl vinyl ketone, vinyltoluene, styrene, α-methylstyrene 2-hydroxyethyl methacrylate, ethyl vinyl ether and vinyl pyrrolidone.

3. The coating method of claim 1, wherein said divinyl monomer is selected from the group consisting of N,N'-methylene-bis acrylamide, divinyl-sulfone, divinylbenzene, ethylene glycol dimethacrylate, ethylene glycol diacrylate and calcium acrylate.

4. The coating method of claim 1, wherein said hydrophilic organic solvent is selected from the group consisting of methyl alcohol, ethyl alcohol, propyl alcohol, butyl alcohol, N,N-dimethyl formamide, dimethylsulfoxide, dioxane, N,N-dimethyl acetamide, ethyl acetate, methyl ethyl ketone, methyl isobutyl ketone, butyl cellosolve, diacetone alcohol and acetonitrile.

5. The coating method of claim 1, wherein said metal ion releasing agent is selected from the group consisting of formic acid, acetic acid, propionic acid, butyric acid malonic acid, succinic acid, glutaric acid, adipic acid, pimelic acid, maleic acid, itaconic acid, benzoic acid, O-phthalic acid, terephthalic acid, trimetic acid, pyromellitic acid, crotonic acid, methacrylic acid, sulfurtic acid, nitric acid, hydrochloric acid, fluoric acid, chromic acid, phosphoric acid and boric acid.

6. The coating method of claim 1, wherein said polymerization catalyst is selected from the group consisting of hydrogen peroxide, cumene hydroperoxide, p-menthane hydroperoxide, lauroyl peroxide, t-butylperoxide, t-butylhydroperoxide, t-butylperbenzoate, methyl ethyl ketone peroxide, cyclohexanone peroxide; peroxides of potassium persulfate, ammonium persulfate, potassium perchlorate, sodium perchlorate and sodium chlorate.

7. The coating method of claim 1, wherein the metal object to be coated is selected from the group consisting of Copper, Zinc, Chromium, Iron, Cobalt, Nickel, Cadmium, Titanium, Molybdenum, Aluminum, Lead, Tin, and alloys thereof.

8. The coating method of claim 1, in which the concentration of the polymerization catalyst is $1 \times 10^{-3} - 1 \times 10^{-1}$ mol/l.

9. The coating method of claim 1, in which the metal object to be coated is immersed for 0.5–20 minutes in the solution.

* * * * *